(12) United States Patent
Gareau

(10) Patent No.: US 9,537,886 B1
(45) Date of Patent: Jan. 3, 2017

(54) FLAGGING SECURITY THREATS IN WEB SERVICE REQUESTS

(71) Applicant: A10 Networks, Inc., San Jose, CA (US)

(72) Inventor: Terrence Gareau, Venice, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

(21) Appl. No.: 14/522,289

(22) Filed: Oct. 23, 2014

(51) Int. Cl.
*H04L 29/06* (2006.01)
*G06F 17/30* (2006.01)

(52) U.S. Cl.
CPC ..... *H04L 63/1441* (2013.01); *G06F 17/30861* (2013.01)

(58) Field of Classification Search
CPC .................. H04L 63/1441; G06F 17/30861
See application file for complete search history.

(56) References Cited

U.S. PATENT DOCUMENTS

| 4,001,819 | A | 1/1977 | Wise |
| 4,780,905 | A | 10/1988 | Cruts et al. |
| 5,101,402 | A | 3/1992 | Chiu et al. |
| 5,163,088 | A | 11/1992 | LoCascio |
| 5,359,659 | A | 10/1994 | Rosenthal |
| 5,414,833 | A | 5/1995 | Hershey et al. |
| 5,511,122 | A | 4/1996 | Atkinson |
| 5,584,023 | A | 12/1996 | Hsu |
| 5,684,875 | A | 11/1997 | Ellenberger |
| 5,757,908 | A | 5/1998 | Cooper et al. |
| 5,805,801 | A | 9/1998 | Holloway et al. |
| 5,835,727 | A | 11/1998 | Wong et al. |
| 5,892,903 | A | 4/1999 | Klaus |
| 5,905,859 | A | 5/1999 | Holloway et al. |

(Continued)

FOREIGN PATENT DOCUMENTS

| TW | 477140 | 2/2002 |
| TW | 574655 | 2/2004 |

(Continued)

OTHER PUBLICATIONS

Thanasegaran et al., Simultaneous Analysis of Time and Space for Conflict Detection in Time-Based Firewall Policies, Jul. 2010, IEEE 10th International Conference on Computer and Information Technology, pp. 1015-1021.*

(Continued)

*Primary Examiner* — Kenneth Chang
(74) *Attorney, Agent, or Firm* — Carr & Ferrell LLP

(57) ABSTRACT

Provided are methods and systems for flagging security threats in web service requests. Specifically, a method for flagging security threats in web service requests can include receiving a request addressed to an addressee. The method can further include analyzing the request based on at least one security signature. The method can continue with determining a threat level associated with the request. The determination can be carried out based on the analysis. The method can further include creating a flag corresponding to the threat level. The method can further include inserting the flag into a network packet associated with the request, thereby creating a modified request. The method may further include sending the modified packet to the addressee. An application associated with the addressee can be operable to selectively process the request based on the threat level.

20 Claims, 9 Drawing Sheets

(56) References Cited

U.S. PATENT DOCUMENTS

| | | | |
|---|---|---|---|
| 5,940,002 A | 8/1999 | Finn et al. | |
| 5,960,177 A | 9/1999 | Tanno | |
| 6,006,272 A | 12/1999 | Aravamudan et al. | |
| 6,170,061 B1 | 1/2001 | Beser | |
| 6,185,681 B1 | 2/2001 | Zizzi | |
| 6,205,115 B1 | 3/2001 | Ikebe et al. | |
| 6,219,706 B1 | 4/2001 | Fan et al. | |
| 6,237,036 B1 | 5/2001 | Ueno et al. | |
| 6,249,866 B1 | 6/2001 | Brundrett et al. | |
| 6,259,789 B1 | 7/2001 | Paone | |
| 6,347,376 B1 | 2/2002 | Attwood et al. | |
| 6,363,486 B1 | 3/2002 | Knapton, III | |
| 6,449,651 B1 | 9/2002 | Dorfman et al. | |
| 6,505,192 B1 | 1/2003 | Godwin et al. | |
| 6,539,435 B2 | 3/2003 | Bolmarcich et al. | |
| 6,553,005 B1 | 4/2003 | Skirmont et al. | |
| 6,578,147 B1 | 6/2003 | Shanklin et al. | |
| 6,594,780 B1 | 7/2003 | Shen et al. | |
| 6,715,081 B1 | 3/2004 | Attwood et al. | |
| 6,732,279 B2 | 5/2004 | Hoffman | |
| 6,735,702 B1 | 5/2004 | Yavatkar et al. | |
| 6,754,832 B1 | 6/2004 | Godwin et al. | |
| 6,757,822 B1 | 6/2004 | Feiertag et al. | |
| 6,779,117 B1 | 8/2004 | Wells | |
| 6,973,040 B1 | 12/2005 | Ricciulli | |
| 6,988,106 B2 | 1/2006 | Enderwick et al. | |
| 7,092,357 B1 | 8/2006 | Ye | |
| 7,194,766 B2 | 3/2007 | Noehring et al. | |
| 7,200,760 B2 | 4/2007 | Riebe et al. | |
| 7,221,757 B2 | 5/2007 | Alao | |
| 7,234,161 B1 | 6/2007 | Maufer et al. | |
| 7,277,963 B2 | 10/2007 | Dolson et al. | |
| 7,372,809 B2 | 5/2008 | Chen et al. | |
| 7,392,241 B2 | 6/2008 | Lin et al. | |
| 7,409,712 B1 | 8/2008 | Brooks et al. | |
| 7,418,733 B2 | 8/2008 | Connary et al. | |
| 7,533,409 B2 | 5/2009 | Keane et al. | |
| 7,543,052 B1 | 6/2009 | Cesa Klein | |
| 7,577,833 B2 | 8/2009 | Lai | |
| 7,596,695 B2 | 9/2009 | Liao et al. | |
| 7,620,733 B1 | 11/2009 | Tzakikario et al. | |
| 7,665,138 B2 | 2/2010 | Song et al. | |
| 7,739,494 B1 | 6/2010 | McCorkendale et al. | |
| 7,823,194 B2* | 10/2010 | Shay | H04L 63/02 726/13 |
| 7,845,004 B2 | 11/2010 | Bardsley et al. | |
| 7,925,766 B2 | 4/2011 | Jayawardena et al. | |
| 7,953,855 B2 | 5/2011 | Jayawardena et al. | |
| 8,010,469 B2* | 8/2011 | Kapoor | G06F 9/505 706/20 |
| 8,089,871 B2 | 1/2012 | Iloglu et al. | |
| 8,220,056 B2 | 7/2012 | Owens, Jr. | |
| 8,239,670 B1 | 8/2012 | Kaufman et al. | |
| 8,276,203 B2 | 9/2012 | Nakhre et al. | |
| 8,286,227 B1* | 10/2012 | Zheng | H04L 63/0853 726/2 |
| 8,301,802 B2 | 10/2012 | Wei et al. | |
| 8,448,245 B2 | 5/2013 | Banerjee et al. | |
| 8,478,708 B1 | 7/2013 | Larcom | |
| 8,595,845 B2 | 11/2013 | Basavapatna et al. | |
| 8,719,446 B2 | 5/2014 | Spatscheck et al. | |
| 8,800,034 B2 | 8/2014 | McHugh et al. | |
| 8,813,228 B2 | 8/2014 | Magee et al. | |
| 8,832,832 B1 | 9/2014 | Visbal | |
| 8,881,284 B1 | 11/2014 | Gabriel | |
| 8,948,380 B2 | 2/2015 | Goto | |
| 9,129,116 B1 | 9/2015 | Wiltzius | |
| 9,130,996 B1 | 9/2015 | Martini | |
| 9,215,208 B2 | 12/2015 | Fraize et al. | |
| 9,245,121 B1 | 1/2016 | Luo et al. | |
| 9,246,926 B2* | 1/2016 | Erlingsson | G06Q 20/401 |
| 9,294,503 B2 | 3/2016 | Thompson et al. | |
| 9,300,623 B1 | 3/2016 | Earl et al. | |
| 2001/0042204 A1 | 11/2001 | Blaker et al. | |
| 2002/0087708 A1 | 7/2002 | Low et al. | |
| 2002/0108059 A1 | 8/2002 | Canion et al. | |
| 2002/0165912 A1 | 11/2002 | Wenocur et al. | |
| 2002/0188839 A1 | 12/2002 | Noehring et al. | |
| 2003/0023846 A1 | 1/2003 | Krishna et al. | |
| 2003/0023876 A1 | 1/2003 | Bardsley et al. | |
| 2003/0028585 A1 | 2/2003 | Yeager et al. | |
| 2003/0035547 A1 | 2/2003 | Newton | |
| 2003/0061507 A1 | 3/2003 | Xiong et al. | |
| 2003/0069973 A1 | 4/2003 | Ganesan et al. | |
| 2003/0123667 A1 | 7/2003 | Weber et al. | |
| 2003/0196081 A1 | 10/2003 | Savarda et al. | |
| 2003/0200456 A1 | 10/2003 | Cyr et al. | |
| 2004/0008711 A1 | 1/2004 | Lahti et al. | |
| 2004/0054807 A1 | 3/2004 | Harvey et al. | |
| 2004/0057579 A1 | 3/2004 | Fahrny | |
| 2004/0059951 A1 | 3/2004 | Pinkas et al. | |
| 2004/0059952 A1 | 3/2004 | Newport et al. | |
| 2004/0091114 A1 | 5/2004 | Carter et al. | |
| 2004/0093524 A1 | 5/2004 | Sakai | |
| 2004/0111635 A1 | 6/2004 | Boivie et al. | |
| 2004/0148520 A1 | 7/2004 | Talpade et al. | |
| 2004/0172538 A1 | 9/2004 | Satoh et al. | |
| 2004/0187032 A1 | 9/2004 | Gels et al. | |
| 2005/0021999 A1 | 1/2005 | Touitou et al. | |
| 2005/0041584 A1 | 2/2005 | Lau et al. | |
| 2005/0044068 A1 | 2/2005 | Lin et al. | |
| 2005/0044352 A1 | 2/2005 | Pazi et al. | |
| 2005/0125684 A1 | 6/2005 | Schmidt | |
| 2005/0180416 A1 | 8/2005 | Jayawardena et al. | |
| 2005/0193199 A1 | 9/2005 | Asokan et al. | |
| 2005/0198099 A1 | 9/2005 | Motsinger et al. | |
| 2005/0235145 A1 | 10/2005 | Slick et al. | |
| 2005/0257093 A1 | 11/2005 | Johnson et al. | |
| 2005/0278527 A1 | 12/2005 | Liao et al. | |
| 2006/0056297 A1 | 3/2006 | Bryson et al. | |
| 2006/0061507 A1 | 3/2006 | Mohamadi | |
| 2006/0143707 A1 | 6/2006 | Song et al. | |
| 2006/0179319 A1 | 8/2006 | Krawczyk | |
| 2006/0185014 A1 | 8/2006 | Spatscheck et al. | |
| 2006/0230444 A1 | 10/2006 | Iloglu et al. | |
| 2006/0265585 A1 | 11/2006 | Lai | |
| 2007/0143769 A1 | 6/2007 | Bu et al. | |
| 2007/0169194 A1* | 7/2007 | Church | G06F 21/552 726/23 |
| 2007/0186282 A1* | 8/2007 | Jenkins | H04L 63/1416 726/22 |
| 2007/0214088 A1 | 9/2007 | Graham et al. | |
| 2007/0280114 A1 | 12/2007 | Chao et al. | |
| 2007/0283429 A1 | 12/2007 | Chen et al. | |
| 2008/0183885 A1 | 7/2008 | Durrey et al. | |
| 2008/0256623 A1 | 10/2008 | Worley et al. | |
| 2009/0077663 A1* | 3/2009 | Sun | H04L 63/1416 726/23 |
| 2009/0083537 A1 | 3/2009 | Larsen et al. | |
| 2009/0168995 A1 | 7/2009 | Banga et al. | |
| 2010/0138921 A1 | 6/2010 | Na et al. | |
| 2010/0284300 A1 | 11/2010 | Deshpande et al. | |
| 2011/0082947 A1 | 4/2011 | Szeto et al. | |
| 2011/0093785 A1 | 4/2011 | Lee et al. | |
| 2011/0131646 A1 | 6/2011 | Park et al. | |
| 2011/0153744 A1 | 6/2011 | Brown | |
| 2011/0188452 A1 | 8/2011 | Borleske et al. | |
| 2011/0249572 A1 | 10/2011 | Singhal et al. | |
| 2011/0282997 A1 | 11/2011 | Prince et al. | |
| 2012/0036272 A1 | 2/2012 | El Zur | |
| 2012/0042060 A1 | 2/2012 | Jackowski et al. | |
| 2012/0096546 A1* | 4/2012 | Dilley | H04L 67/2804 726/22 |
| 2012/0110472 A1 | 5/2012 | Amrhein et al. | |
| 2012/0144461 A1* | 6/2012 | Rathbun | H04L 9/3213 726/5 |
| 2012/0155274 A1 | 6/2012 | Wang et al. | |
| 2012/0159623 A1 | 6/2012 | Choi | |
| 2012/0163186 A1 | 6/2012 | Wei et al. | |
| 2012/0170753 A1 | 7/2012 | Pandrangi et al. | |
| 2012/0173684 A1 | 7/2012 | Courtney et al. | |
| 2012/0174196 A1 | 7/2012 | Bhogavilli et al. | |
| 2012/0227109 A1* | 9/2012 | Dimuro | G06F 21/56 726/24 |

(56) References Cited

U.S. PATENT DOCUMENTS

| | | |
|---|---|---|
| 2012/0250866 A1 | 10/2012 | Matsuo |
| 2012/0260329 A1 | 10/2012 | Suffling |
| 2012/0266242 A1 | 10/2012 | Yang et al. |
| 2013/0019025 A1 | 1/2013 | Chaturvedi et al. |
| 2013/0103834 A1 | 4/2013 | Dzerve et al. |
| 2013/0139245 A1 | 5/2013 | Thomas |
| 2013/0198845 A1 | 8/2013 | Anvari |
| 2013/0212265 A1 | 8/2013 | Rubio Vidales et al. |
| 2013/0227646 A1 | 8/2013 | Haggerty et al. |
| 2013/0243194 A1 | 9/2013 | Hawkes et al. |
| 2013/0263256 A1 | 10/2013 | Dickinson et al. |
| 2014/0137190 A1 | 5/2014 | Carey et al. |
| 2014/0269308 A1 | 9/2014 | Oshiba |
| 2014/0280832 A1 | 9/2014 | Oshiba |
| 2014/0325588 A1 | 10/2014 | Jalan et al. |
| 2014/0325648 A1 | 10/2014 | Liu et al. |
| 2014/0344925 A1 | 11/2014 | Muthiah |
| 2015/0033341 A1 | 1/2015 | Schmidtler et al. |
| 2015/0058977 A1 | 2/2015 | Thompson et al. |
| 2015/0143118 A1 | 5/2015 | Sheller et al. |
| 2015/0220745 A1 | 8/2015 | Nellitheertha et al. |
| 2015/0281177 A1 | 10/2015 | Sun |
| 2016/0036651 A1 | 2/2016 | Sureshchandra et al. |
| 2016/0134655 A1 | 5/2016 | Thompson et al. |
| 2016/0182509 A1 | 6/2016 | Kantecki et al. |
| 2016/0226896 A1 | 8/2016 | Bhogavilli et al. |

FOREIGN PATENT DOCUMENTS

| | | |
|---|---|---|
| TW | NI197237 | 2/2004 |
| TW | I225999 | 1/2005 |
| TW | I241818 | 10/2005 |
| TW | I252976 | 4/2006 |
| WO | WO9842108 | 9/1998 |
| WO | WO9948303 A2 | 9/1999 |
| WO | WO0062167 A1 | 10/2000 |
| WO | WO2006039529 | 4/2006 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Oracle Corporation. Oracle Intelligent Agent User's Guide, Release 9.2.0, Part No. A96676-01. Mar. 2002.

SOL11243. iRules containing the RULE__INIT iRule event do not re-initialize when a syntax error is corrected. f5. support.com. May 24, 2010.

Mutz, "Linux Encryption How To," available at http://encryptionhowto.sourceforge.net/Encryption-HOWTO-1.html, Oct. 4, 2000.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Liebergeld, Steffen et al., "Cellpot: A Concept for Next Generation Cellular Network Honeypots," Internet Society, Feb. 23, 2014, pp. 1-6.

Spatscheck et al., "Optimizing TCP Forwarder Performance", IEEE/ACM Transactions on Networking, vol. 8, No. 2, Apr. 2000.

Lee, Patrick P. C. et al., "On the Detection of Signaling DoS Attacks on 3G Wireless Networks," IEEE INFOCOM 2007—26th IEEE International Conference on Computer Communications processings, May 6-12, 2007, pp. 1289-1297.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

\* cited by examiner

Signature
721

- Source network address
- HTTP request URL pattern
- Content pattern
- User Identity
- Document Identity
- Other pattern or identity

FIG. 6

FLAGGING SECURITY THREATS IN WEB SERVICE REQUESTS

TECHNICAL FIELD

This disclosure relates generally to data processing and, more particularly, to flagging security threats in web service requests.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

In a secured data network, a service request is subjected to a security check. If a service request matches a threat signature, also referred to as a security signature, the request can be denied or discarded. Using this approach, the request cannot reach an intended application, thereby preventing a possible security threat. Examples of such threats include Distributed Denial of Service (DDoS) attacks, web site phishing, email virus, zero-day attack, and many others. Typically, security systems are implemented on a network device, such as a switch, a router, a load balancer, or a network appliance within a data network.

However, security signatures are not fool proof. There are false positive situations where a proper service request is falsely identified as a threat when the service request matches a security signature. Due to the security system's strict denial policy, the benign service request may never reach the intended server no matter how many times a user tries to resend the same service request. The user would believe, upon failure of the service request, that the network session or the service request is unavailable. Therefore, it is desirable to mark the network session or the service request with a threat level without blocking or denying the network session or service request.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for flagging security threats in web service requests. In one embodiment, a method for flagging security threats in web service requests may start with receiving a request addressed to an addressee. The method may further include analyzing the request based on at least one security signature. The method may further include determining a threat level associated with the request. The determination may be carried out based on the analysis. The method may further include creating a flag corresponding to the threat level. The method may further include inserting the flag into a network packet associated with the request, thereby creating a modified request. The method may further include sending the modified packet to the addressee. An application associated with the addressee may be operable to process the request based on the threat level.

In another example embodiment, there is provided a system for flagging security threats in web service requests. The system may include at least one processor and a database in communication with the processor. The processor may be operable to receive a request addressed to an addressee. The processor may analyze the request based on at least one security signature. Based on the analysis, the processor may determine a threat level associated with the request. The processor may further create a flag corresponding to the threat level. After creating the flag, the processor may insert the flag into a network packet associated with the request to create a modified request. The processor may send the modified packet to the addressee. An application associated with the addressee may be operable to process the request based on the threat level.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings.

FIG. 6 is a block diagram demonstrating a security signature.

DETAILED DESCRIPTION

Figure 1:
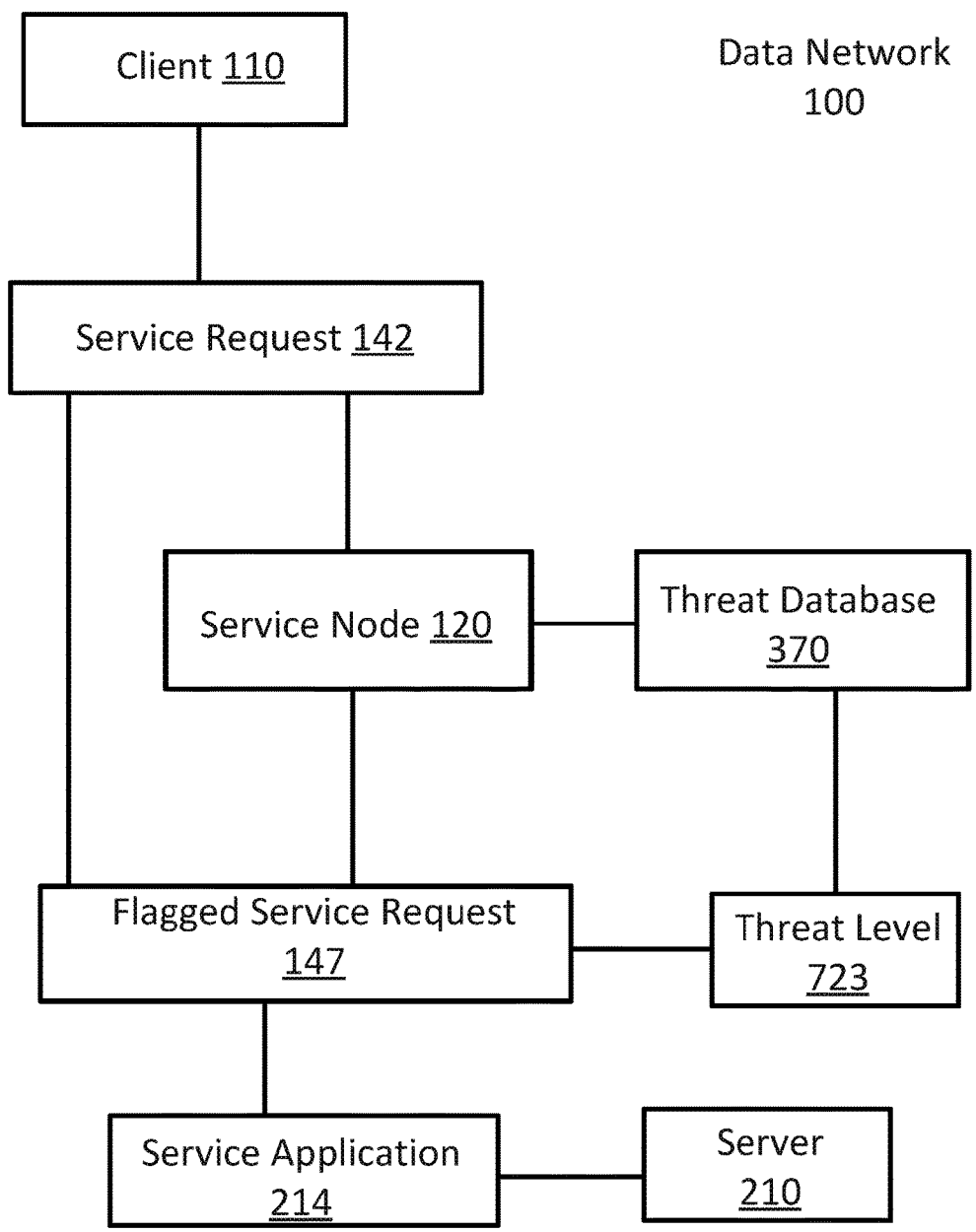
FIG. 1 is a block diagram illustrating a data network within which a method for providing flagging of a security threat of a web service request can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), a game console, a handheld gaming device, a cellular phone, a smart phone, a smart television system, and so forth.

The present disclosure relates to a method and system for flagging security threats in web service requests. According to an embodiment of the present disclosure, a client can establish a data service session with a server via a service node. In other words, the client can send a service request to the service node. The service request may include one or more data packets. Moreover, the service request may have a security signature. The security signature can include a representation of a set of features of the service request. These features may include information from a network packet header, packet payload, temporal characteristics of flows, and so forth.

The service node may receive the service request of the client. Upon receiving the service request, the service node that acts as a security module may examine the service request to determine a threat level of the service request. The service node may analyze the security signature of the service request. The service node may compare data contained in the security signature against databases, blacklists, whitelists, key-value storages, and other sources available to the service node. For example, the security signature may include a source Internet Protocol (IP) address of the service request. The service node may compare the source IP address of the service request with a blacklist of IP addresses.

Based on the analysis of the security signature of the service request, the service node may determine a threat level of the service request. For example, the threat level may be classified 0 to 5 based on analysis of the security signature. The threat level of 0 may be assigned to the service request that constitutes no threat. Similarly, the threat level of 1 may be assigned to the service request that constitutes a low threat. The threat level of 5 may be assigned to the service request that constitutes a high threat. For example, if the source IP address of the service request is marked as 'dangerous' in the blacklist, the service node may determine that the threat level is high and mark the threat level of the service request as '5'.

Upon determining the threat level, the service node may modify the service request by inserting a data packet. The data packet may contain information about the threat level of the service request. For example, if the service request is a HyperText Transfer Protocol (HTTP) request, the service node may insert a flag into a header of the HTTP request. The flag may represent the threat level. For example, the flag may be shown as '5' to represent the high threat level of the service request.

When the service request is flagged, the service node may send the service request to a further node in a data network, such as the server. The further node may extract data contained in the flag from the service request. The further node may be a hardware node, such as a router, or a software node, such as an application associated with the server. Both the hardware node and the software node may be configured to extract the flag from the service request and perform further processing of the service request based on data contained in the extracted flag.

Thus, the method of the present disclosure allows not to dropping the service request even when the threat is revealed. Instead, the method modifies the service request by appending the threat level data to the service request. Thus, making a decision of how to handle the service request with a certain threat level is shifted to a further node or application in the data network. The server or an application associated with the server may decide how to process the request based on the security threat level.

Referring now to the drawings, FIG. 1 is a block diagram showing a data network 100 handling a service session between a client device and a service application, according to an example embodiment. In one embodiment, data network 100 includes an Ethernet network, an Automated Teller Machine (ATM) network, a cellular network, a wireless network, a Frame Relay network, an optical network, an IP network, or a data communication network utilizing other physical layers, link layer capability, or network layers to carry data packets.

In an example embodiment, a service node 120 of the data network 100 processes a service request 142 from a client device shown as a client 110 to a service application 214 associated with a server device shown as a server 210. The client 110 may include a computing device connected to the data network 100 using a network module of the client 110. In one embodiment, the client 110 can include a personal computer (PC), a laptop computer, a tablet, a smartphone, a mobile phone, an Internet phone, a netbook, a home gateway, a broadband gateway, a network appliance, a set top box, a media server, a personal media player, a personal digital assistant (PDA), a personal computing device, an access gateway, a networking switch, a server computer, a network storage computer, or any computing device comprising a network module and a processor module.

The service node 120 may include a server load balancer (SLB), a firewall, a network security device, an application delivery controller (ADC), a traffic manager, a network switch, a router, a service gateway, a network blade of a server, a server, and so forth.

In one embodiment, the service node 120 examines the service request 142 to determine a threat level 723 for the service request 142. More specifically, the service node 120 may examine a security signature (not shown) of the service request 142. In an example embodiment, the service node 120 communicates with a threat database 370. The service node 120 may match the security signature of the service request 142 against the threat database 370 and determine that there is a match between the security signature of the service request 142 and the threat database 370. The service node 120 may retrieve the threat level 723 from the threat database 370.

In an example embodiment, the service node 120 may match the security signature of the service request 142 against a key-value storage (not shown). In the key-value storage, keys may include a source network address, a cookie, and other service request attributes, whereas values may include a threat level. The service node 120 may extract a key from the security signature of the service request 142, such as a source network address, and search the key in the key-value storage. In case the key is found in the key-value storage, the service node 120 may look up for a threat level 723, which is represented in the key-value storage by the value associated with the key.

Based on the determined threat level 723, the service node 120 may generate a flagged service request 147. In an example embodiment, the flagged service request 147 is the service request 142 modified by inserting a flag, where the flag is the threat level 723. The service node 120 may send the flagged service request 147 to the service application 214. The service application 214 may be executed by the server 210. Alternatively, in an example embodiment, the service application 214 is executed by the service node 120.

The server 210 may include a server computer connected to data network 100 using a network module of the server computer. In one embodiment, the server 210 executes the service application 214 to service the service request 142 requested by the client 110. The server 210 may include a web server, a video server, a music server, an e-commerce server, an enterprise application server, a news server, a mobile broadband service server, a messaging server, an email server, a game server, an app server, an Internet radio server, a storage server, a social network services server, or a network computing device providing services to a service session from the client 110. The service session may be a web page access session, an e-commerce transaction session, a video playing session, a music playing session, a file transfer session, an image downloading session, a message chat session, a session to send a message, a picture, a video, a file, a game playing session, or any data communication session between the client 110 and the server 210.

In an example embodiment, the service application 214 receives and processes the flagged service request 147. The service application 214 may retrieve the service request 142 and the threat level 723 from the flagged service request 147. The service application 214 may process the service request 142 based on the threat level 723.

In an example embodiment, the service application 214 processes the service request 142 without considering the threat level 723. In a further example embodiment, the service application 214 processes the service request 142 of the flagged service request 147 differently from processing the service request 142 in case the threat level 723 is inserted into the service request 142 by the service node 120.

The processing of the service request 142 by the service application 214 may provide the same service session between the server 210 and the client 110 both for the case when the service application 214 receives the threat level 723 and the case when the service application 214 does not receive the threat level 723. In an example embodiment, the service application 214 sends a threat indication to the client 110 based on the threat level 723.

In an example embodiment, the service request 142 includes an HTTP request, a file transfer request, a Fire Transfer Protocol (FTP) session request, a voice over IP session request, a Session Initiation Protocol (SIP) session request, a video or audio streaming session request, an e-commerce request, an enterprise application session request, an email session request, an online gaming session request, a teleconference session request, or a web-based communication session request. In one embodiment, the service application 214 provides or processes an HTTP session, file transfer services, transaction processing, credit card processing, enterprise application processing, video and/or audio streaming, voice over IP services, teleconferencing services, e-commerce services, e-mail services, social media services, personal communication services, online gaming services, advertisement services, or any web-based services.

In an example embodiment, the service application 214 handles credit card information. In one embodiment, the threat level 723 indicates a medium risk. The service application 214 may determine, based on the medium risk threat level 723, to prompt the client 110 to enter detailed credit card information instead of using pre-stored credit card information about client 110. In other words, the service application 214 provides the client 110 with an access to a web site on which the client 110 enters the credit card information only after applying a second factor identification of the client 110. In another embodiment, the threat level 723 indicates a high risk. In this case, the service application 214 may not allow usage of any credit card.

In a further example embodiment, the service application 214 handles enterprise confidential information. In one embodiment, the threat level 723 indicates that the service request 142 originates from a network outside the enterprise network. The service application 214 may determine, based on the threat level 723, to prompt the client 110 to provide additional user credential information. Additionally, the service application 214 may restrict access to certain enterprise documents that are permitted if the client 110 is within the enterprise network.

In a further example embodiment, the service application 214 handles social data for a user of the client 110. In one embodiment, the threat level 723 indicates that the service request 142 is of a medium security risk. The service application 214 may prompt the client 110 for additional user identification information prior to allowing the client 110 to access the social data for the user. In other words, a second factor identification may be applied. In one embodiment, the threat level 723 indicates that the service request 142 is of a high security risk. In this case, the service application 214 may deny the client 110 access to social data for the friends of the user.

In an example embodiment, the threat level 723 indicates a risk, and the service application 214 ignores the risk indicated by the threat level 723. The service application 214 may process the service request 142 as if the threat level 723 was not present. In a further embodiment, the service application 214 reports the threat level 723 of the service request 142 to a network computer or a network security monitoring computer.

In an example embodiment, the service application 214 may route the service request 142 to different nodes based on the threat level 723. For example, if the threat level 723 is low or '0', the service application 214 may route the service request 142 directly to the server 210. If the threat level 723 is high or '5', the service application 214 may route the service request 142 to a further node (not shown) in the data network 100 that is responsible for processing service requests having a high threat level. In particular, the further node may perform steps to change the threat level of the service request 142 from high to low. After altering the threat level, the further node may route the service request 142 to the server 210.

Figure 2:
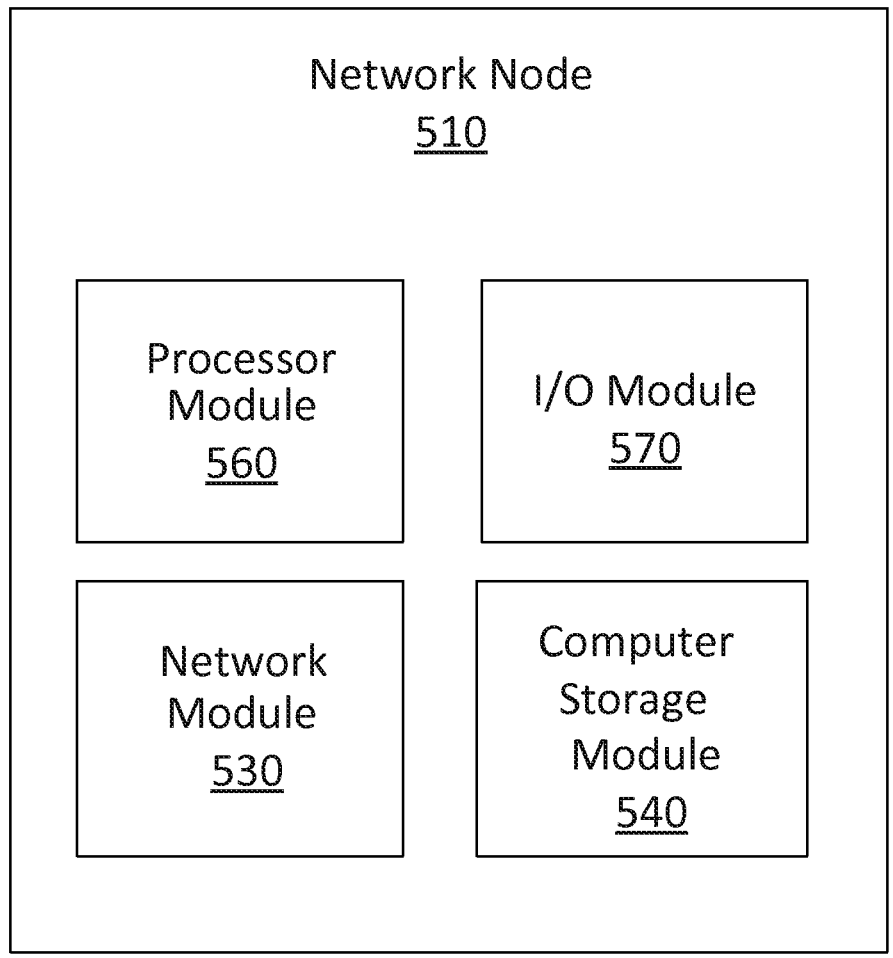
FIG. 2 is a block diagram illustrating components of a network node.

FIG. 2 illustrates an exemplary embodiment of a network node 510 of the data network. The network node can be a client device, a sever device, a service node, or other computing device in the data network. In one embodiment, the network node 510 includes a processor module 560, a network module 530, and a computer storage module 540. In one embodiment, the processor module 560 includes one or more processors, which may be a micro-processor, an Intel processor, an Advanced Micro Devices (AMD) processor, a Microprocessor without Interlocked Pipeline Stages (MIPS) processor, an ARM-based processor, or a RISC processor.

The processor module 560 may include one or more processor cores embedded in a processor. In an example embodiment, the processor module 560 includes one or more embedded processors, or embedded processing elements in a Field Programmable Gate Array (FPGA), ASIC, or Digital Signal Processor (DSP).

The network module 530 may include a network interface, such as Ethernet, an optical network interface, a wireless network interface, T1/T3 interface, or a WAN or LAN interface. In one embodiment, the network module 530 includes a network processor. In one embodiment, the computer storage module 540 includes RAM, DRAM, SRAM, SDRAM or memory utilized by the processor module 560 or the network module 530.

In one embodiment, the computer storage module 540 stores data utilized by processor module 560. In one embodiment, the computer storage module 540 includes a hard disk drive, a solid state drive, an external disk, a DVD, a CD, or a readable external disk. The computer storage module 540 may store one or more computer programming instructions, which when executed by the processor module 560 or the network module 530, implement one or more of the functionalities of the present disclosure.

In one embodiment, the network node 510 further includes an input/output (I/O) module 570, which may include a keyboard, a keypad, a mouse, a gesture based input sensor, a microphone, a physical or sensory input peripheral, a display, a speaker, or a physical or sensual output peripheral.

Figure 3:
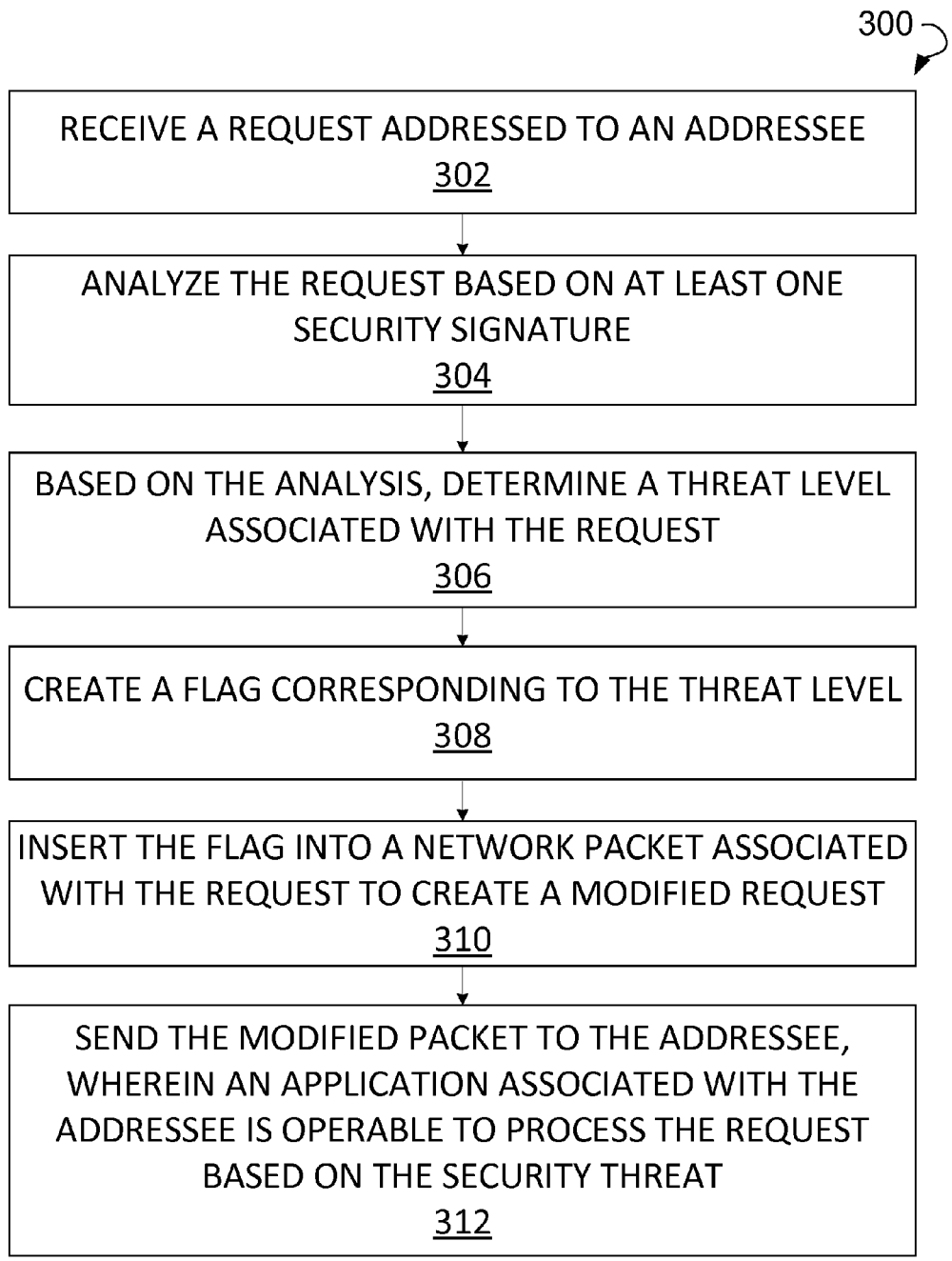
FIG. 3 is a process flow diagram illustrating a method for flagging security threats in web service requests.

FIG. 3 illustrates a method 300 for flagging security threats in web service requests, according to an example embodiment. In some embodiments the steps may be combined, performed in parallel, or performed in a different order. The method 300 may also include additional or fewer steps than those illustrated.

The method 300 may commence with receiving, by at least one processor, a request addressed to an addressee at operation 302. The addressee may include a server, an application associated with the server, and so forth. The request may include a service request. The request may include a security signature. The method 300 may continue with analyzing the request based on at least one security signature at operation 304.

The method 300 may include determining a threat level associated with the request at operation 306. The determining may be performed based on the analysis. The method 300 may include creating a flag corresponding to the threat level at operation 308. In an example embodiment, the determining of the threat level is based on one or more of the following: a blacklist, a whitelist, a reputational database, a threat database, a key-value storage, and so forth.

The method 300 may continue with inserting the flag into a network packet associated with the request to create a modified request at operation 310. In an example embodiment, the flag is inserted in a header of the network packet.

The method 300 may further include sending the modified packet to the addressee at operation 312. An application associated with the addressee may be operable to decide how to process the request based on the threat level. The processing of the request based on the threat level may include dropping the request, requesting verification information, passing the request to the addressee, rerouting the request to an alternative destination, and so forth. Requesting verification information may include a second factor identification.

In an example embodiment, the threat level includes at least a safe level, a suspicious level, and a critical level. A request having the safe level may be passed to the addressee. In an example embodiment, verification information is requested for a request having the suspicious level. The request may be selectively passed to the addressee based on the verification information. In a further example embodiment, a request having the critical level is dropped.

Figure 4:
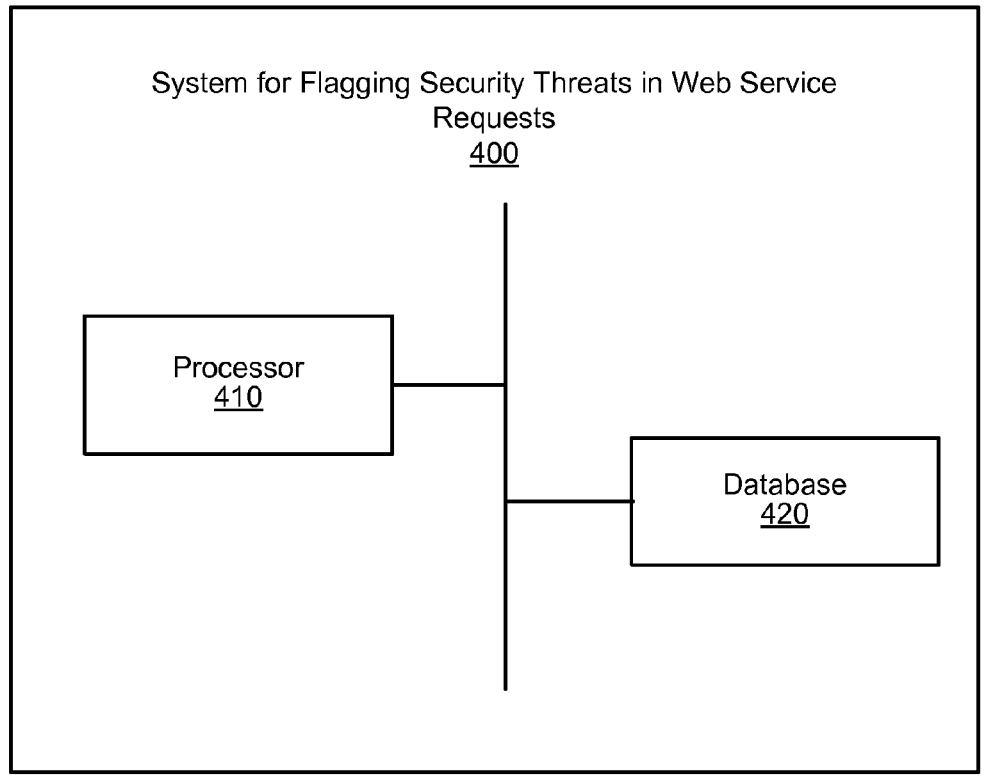
FIG. 4 is a block diagram illustrating a system for flagging security threats in web service requests.

FIG. 4 is a block diagram representing components of a system 400 for flagging security threats in web service requests, in accordance with certain embodiments. The system 400 may include at least one processor 410. The processor 410 may be operable to receive a request addressed to an addressee. The processor 410 may be further operable to analyze the request based on at least one security signature. Furthermore, the processor 410 may be operable to determine a threat level associated with the request. The determination may be performed based on the analysis performed by the processor 410. In an example embodiment, the threat level is determined using one or more of the following: a blacklist, a whitelist, a reputational database, a threat database, a key-value storage, and so forth. The processor 410 may be further operable to create a flag corresponding to the threat level. The processor 410 may be operable to insert the flag into a network packet associated with the request to create a modified request. In an example embodiment, the flag is inserted in a header of the network packet. The processor 410 may be operable to send the modified packet to the addressee. An application associated with the addressee may be operable to decide how to process the request based on the threat level.

In an example embodiment, the threat level includes at least a safe level, a suspicious level, and a critical level. The application associated with the addressee may detect that the request has a safe level. Based on the detection, the application may pass the request to the addressee. In a further example embodiment, the application may detect that the request has a critical level. Based on the detection, the application may drop the request.

In a further example embodiment, the application may detect that the request has a suspicious level. Based on the detection, the application may request for verification information. The verification information may include a second factor identification. More specifically, the verification information may include one or more of the following: payment data, credit card information, a billing zip code, a secret question, and the like. In an example embodiment, the application detects that no verification information is received during a predefined period of time. Based on the detection, the application may drop the request. Furthermore, the application may detect that verification information is received during a predefined period of time. Based on the detection, the application may check validity of the verification information. Based on the check, the application may selectively pass the request to the addressee.

The system 400 may further include a database 420 in communication with the processor 410. The database 420 may include computer-readable instructions for execution by the at least one processor 410.

Figure 5:
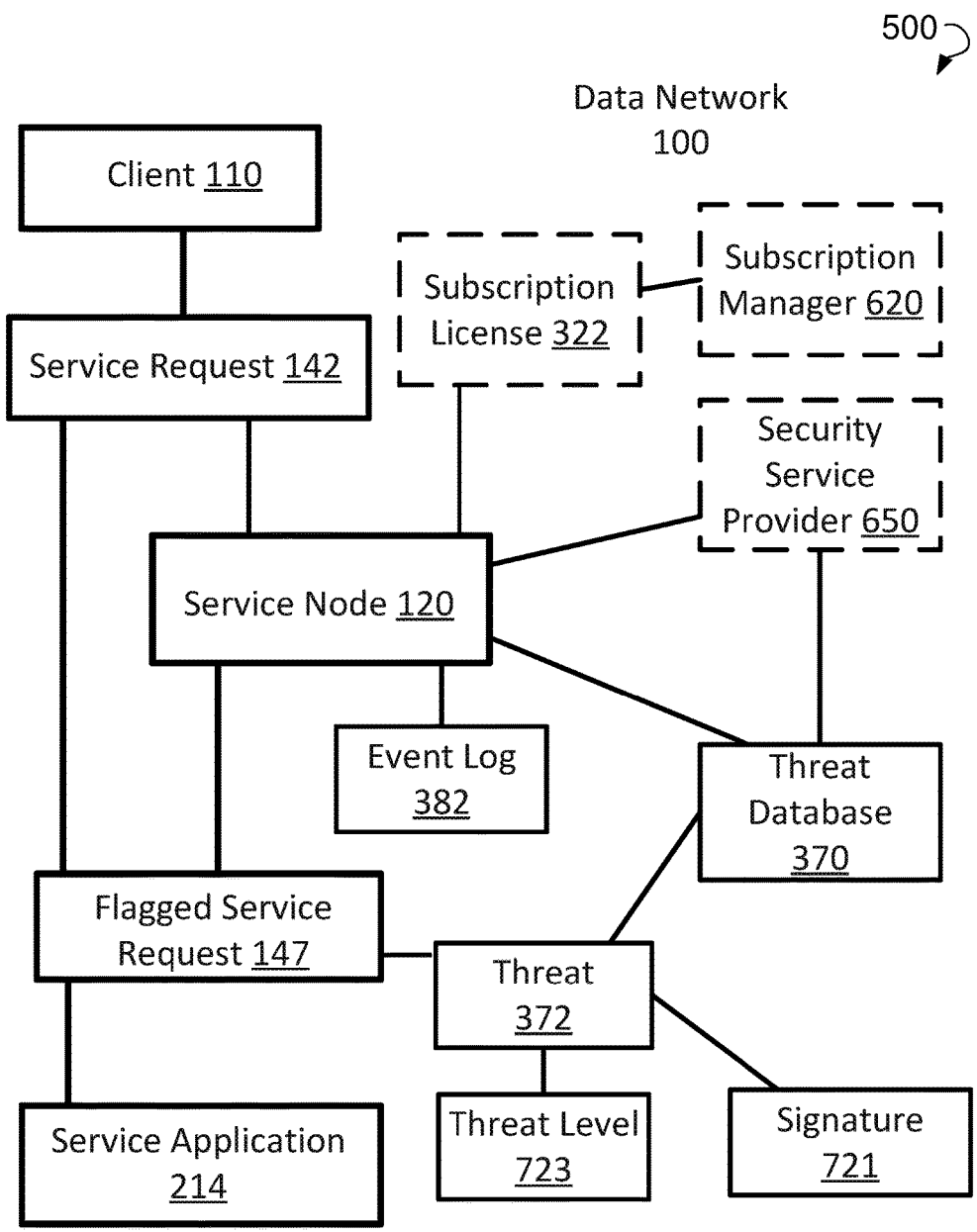
FIG. 5 is a block diagram illustrating a data network within which a method for inserting a flag indicating a security threat can be implemented.

FIG. 5 illustrates a block diagram 500 of a data network to insert a flag indicating a threat level. The service node 120 may receive a service request 142 from a client 110. The service node 120 may communicate with a threat database 370. The service node 120 may match the service request 142 against the threat database 370. In one embodiment, the threat database 370 includes a plurality of threats, such as a threat 372. In one embodiment, the service node 120 matches the service request 142 against the threat 372 of the threat database 370. In one embodiment, the threat 372 includes a signature 721 and a threat level 723. The service node 120 may match the service request 142 against the signature 721 of the threat 372.

In an example embodiment illustrated in FIG. 6, the signature 721 indicates one or more of a source network address, an HTTP request URL pattern, a pattern in content, a cookie or attribute pattern, a user identity, a document identity, or other identity or pattern.

Referring back to FIG. 5, the service node 120 may match the signature 721 with the service request 142. In one embodiment, the service node 120 retrieves corresponding information from the service request 142 based on the signature 721, such as a source and/or destination network addresses of the service request 142, an HTTP request URL of the service request 142, content from data packets of the service request 142, contents of cookies and attributes of the service request 142, one or more user identities obtained from the service request 142, one or more document identities obtained from the service request 142, or one or more other patterns and identities obtained from the service request 142. The service node 120 may match the signature 721 with the retrieved corresponding information from the service request 142. In one embodiment, the service node 120 determines that there is no match of the signature 721.

In one embodiment, service node 120 determines that there is a match of the signature 721 against the service request 142. The service node 120 may retrieve the threat level 723 from the threat 372 corresponding to the signature 721.

Furthermore, the service node 120 may generate a flagged service request 147 using the service request 142 and the threat level 723. In one embodiment, the service node 120 inserts the threat level 723 into the service request 142 to generate the flagged service request 147.

In an example embodiment, the data network 100 may optionally include a subscription manager device shown as a subscription manager 620. The service node 120 obtains a subscription license 322 from the subscription manager 620. The subscription license 322 may contain information allowing the service node 120 to obtain information from the threat database 370.

In a further example embodiment, the data network 100 may optionally include a security service provider device shown as a security service provider 650. The service node 120 may obtain the threat database 370 from the security service provider 650. In one embodiment, the service node 120 sends the subscription license 322 to the security service provider 650, and the security service provider 650, using subscription information in the subscription license 322, sends the threat database 370 to the service node 120. In one embodiment, the security service provider 650 verifies the subscription license 322 with the subscription manager 620.

Figure 7:
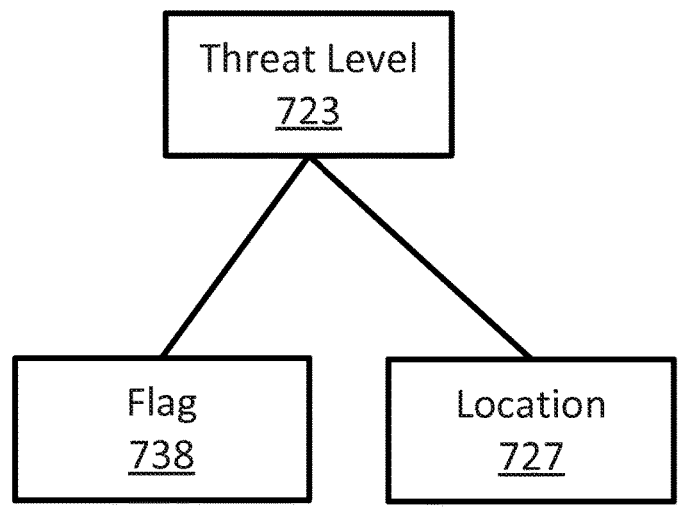
FIG. 7 is a block diagram demonstrating a threat level.

FIG. 7 shows a block diagram 700 representing the threat level 723. The threat level 723 may include a flag 738 and a location 727. Referring again to FIG. 5, the service node 120 may insert the flag 738 at location 727 of the service request 147. In one embodiment, the flag 738 is a numeric value such as 0, 5, 10, indicating the relative degree of threat, or one or more words such as "red," "orange," "green," "not a threat," "medium risk," "high risk," "outside network," "external," "inside network," "insider," and the like indicating the degree of threat. In one embodiment, the flag 738 is a number pattern such as OxOOOF, 0x1, 0001000, and the like, and is to be set at the location 727.

In one embodiment, the location 727 specifies a cookie or an attribute such as an HTTP header attribute "x-security" or "x-threat," or a HTTP cookie "user-security" or "user-threat-level." The service node 120 inserts the corresponding cookie or attribute to the service request 142 with the cookie or attribute value set to be the flag 738.

In one embodiment, the location 727 specifies a network protocol location or option such as an IP protocol DSCP flag, IP protocol TOS flag, an IP protocol option, a TCP option, a UDP option, a FTP command option, a SIP attribute, an XML tag, or another network protocol or application protocol attribute.

Furthermore, referring again to FIG. 5, the service node 120 may send the flagged service request 147 to a service application 214. The service node 120 may generate a security activity event log 382 based on the processing of the service request 142. In one embodiment, the event log 382 indicates that there is no match for the service request 142. In one embodiment, the event log 382 indicates that there is a match for the service request 142. In one embodiment, the event log 382 indicates the threat 372, the signature 721, the threat level 723, or the flag 738 when there is a match for the service request 142. In one embodiment, the event log 382 includes processing results for prior service requests. In one embodiment, the service node 120 updates the event log 382 with processing results for the service request 142.

Figure 8:
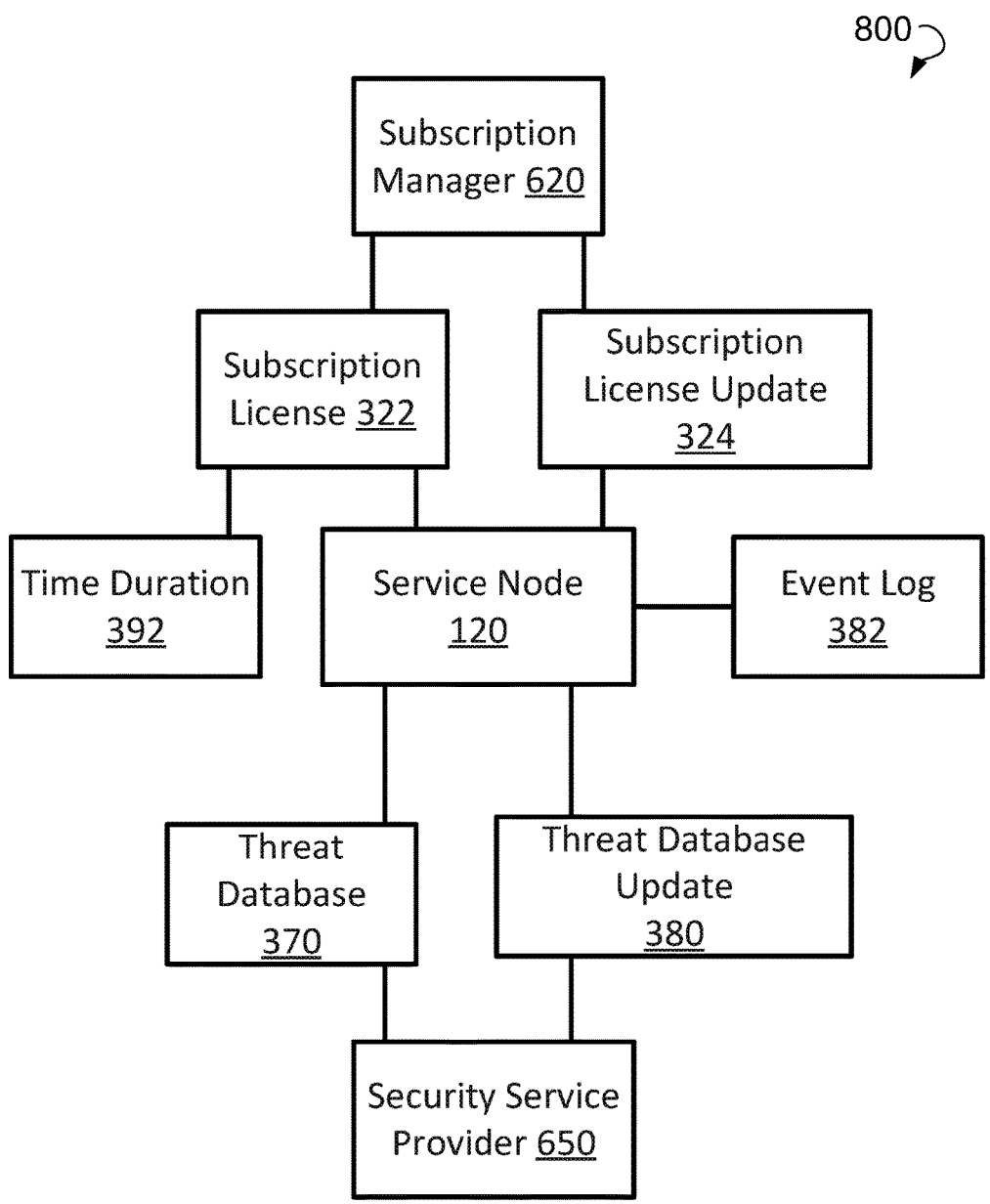
FIG. 8 is a block diagram demonstrating how a subscription to a threat database can be implemented.

FIG. 8 represents a block diagram 800 that shows updating of the threat database. In an example embodiment, the service node 120 receives a threat database update 380 from the security service provider 650. In one embodiment, the service node 120 sends the subscription license 322 to the security service provider 650 to receive the threat database 370 as illustrated in FIG. 5. In one embodiment, the subscription license 322 includes a time duration 392 indicating validity of the subscription license 322 during time duration 392, and the security service provider 650 sends the threat database update 380 to the service node 120. In one embodiment, the security service provider 650 sends the threat database update 380 regularly, periodically, or from time to time, to the service node 120. In one embodiment, the security service provider 650 sends the threat database update 380 when the threat database update 380 is available. In one embodiment, the security service provider 650 does not send the threat database update 380 when time duration 392 expires or when the security service provider 650 determines that the subscription license 322 is no longer valid.

In one embodiment, the service node 120 receives the subscription license update 324 for the subscription license 322 from the subscription manager 620. The service node 120 sends the subscription license update 324 to the security service provider 650 prior to receiving the threat database update 380. In one embodiment, the security service provider 650 receives the subscription license update 324 and determines validity of the subscription license 322. The security service provider 650 sends the threat database update 380 to the service node 120. In one embodiment, the service node 120 sends the event log 382 to the security service provider 650, and the security service provider 650 combines information in the event log 382 with the threat database 370 to generate the threat database update 380.

Figure 9:
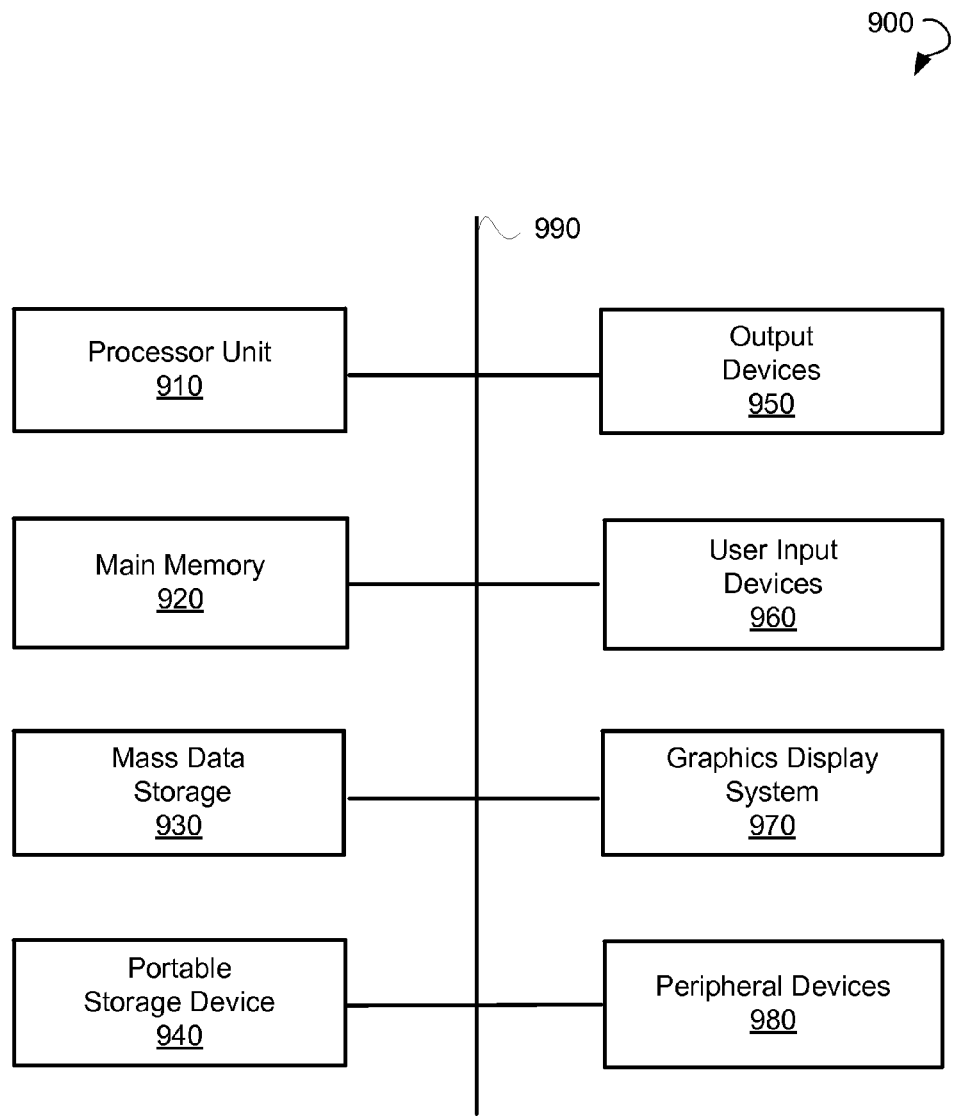
FIG. 9 shows a diagrammatic representation of a computing device for a machine, within which a set of instructions for causing the machine to perform any one or more of the methodologies discussed herein, can be executed.

FIG. 9 illustrates an example computer system 900 that may be used to implement embodiments of the present disclosure. The system 900 of FIG. 9 can be implemented in the contexts of the likes of computing systems, networks, servers, or combinations thereof. The computing system 900 of FIG. 9 includes one or more processor units 910 and main memory 920. Main memory 920 stores, in part, instructions and data for execution by processor 910. Main memory 920 stores the executable code when in operation. The computer system 900 of FIG. 9 further includes a mass data storage 930, portable storage medium drive(s) 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor unit 910 and main memory 920 are connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit 910. Mass data storage 930 stores the system software for implementing embodiments of the present disclosure for purposes of loading that software into main memory 920.

Portable storage device 940 operates in conjunction with a portable non-volatile storage medium, such as a floppy disk, CD, DVD, or Universal Serial Bus (USB) storage device, to input and output data and code to and from the computer system 900 of FIG. 9. The system software for implementing embodiments of the present disclosure is stored on such a portable medium and input to the computer system 900 via the portable storage device 940.

User input devices 960 provide a portion of a user interface. User input devices 960 include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices include speakers, printers, network interfaces, and monitors.

Graphics display system 970 includes a liquid crystal display (LCD) or other suitable display device. Graphics display system 970 receives textual and graphical information and processes the information for output to the display device.

Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 of FIG. 9 can be a PC, hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, BLU-RAY DISC (BD), any other optical storage medium, Random-Access Memory (RAM), Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for flagging security threats in web service requests are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A computer-implemented method for flagging security threats in web service requests, the method comprising:
   receiving, by at least one processor, a request addressed to an addressee;
   analyzing, by the at least one processor, the request based on at least one security signature;
   based on the analysis, determining, by the at least one processor, a threat level associated with the request;
   determining, by the at least one processor, a flag and a location associated with the threat level;

inserting, by the at least one processor, the flag into a network packet associated with the request to create a modified request, the inserting into the network packet being at a position in the network packet indicated by the location; and sending, by the at least one processor, the modified request to the addressee, wherein an application associated with the addressee is operable to process the request based on the threat level.

2. The method of claim 1, wherein processing of the request by the application based on the security signature includes at least one of the following: dropping the request, requesting further information, relaying the request to the addressee, and rerouting the request to an alternative destination.

3. The method of claim 2, wherein the requesting further information includes a second factor identification.

4. The method of claim 1, wherein the flag is inserted into a header of the network packet.

5. The method of claim 1, wherein the flag indicates at least one of the following: a safe level, a suspicious level, and a critical level.

6. The method of claim 5, wherein the application relays the request to the addressee only if the flag indicates the safe level.

7. The method of claim 5, wherein the application is operable to request further verification information for the request having the flag indicating the suspicious level, the request being selectively passed to the addressee based on the verification information.

8. The method of claim 5, wherein the request having the flag indicating the critical level is dropped.

9. The method of claim 1, wherein the determining of the threat level is based on at least one of the following: a blacklist, a whitelist, a reputational database, a key-value storage, and a threat database.

10. A system for flagging security threats in web service requests, the system comprising:
at least one hardware processor operable to:
receive a request addressed to an addressee;
analyze the request based on at least one security signature;
based on the analysis, determine a threat level associated with the request;
determine a flag and a location associated with the threat level;
insert the flag into a network packet associated with the request to create a modified request, the inserting into the network packet being at a position in the network packet indicated by the location; and
send the modified request to the addressee, wherein an application associated with the addressee is operable to process the request based on the threat level; and
a database in communication with the at least one hardware processor, the database comprising computer-readable instructions for execution by the at least one hardware processor.

11. The system of claim 10, wherein the flag is inserted into a header of the network packet.

12. The system of claim 10, wherein the threat level is determined using at least one the following: a blacklist, a whitelist, a reputational database, a key-value storage, and a threat database.

13. The system of claim 10, wherein the flag indicates at least one of the following: a safe level, a suspicious level, and a critical level.

14. The system of claim 13, wherein the application is operable to:
determine that the flag indicates the safe level; and
based on the determination, selectively relay the request to the addressee.

15. The system of claim 13, wherein the application is operable to:
determine that the flag indicates the critical level; and
based on the determination, selectively drop the request.

16. The system of claim 13, wherein the application is operable to:
detect that the flag indicates the suspicious level; and
based on the detection, selectively request further verification information.

17. The system of claim 16, wherein the application is further operable to:
determine that the further verification information is not received during a predetermined period of time; and
based on the determination, selectively drop the request.

18. The system of claim 16, wherein the application is further operable to:
detect that the further verification information is received during a predefined period of time;
verify the further verification information; and
based on the verification of the further verification information, selectively relay the request to the addressee.

19. The system of claim 16, wherein the further verification information includes at least one of the following: payment data, credit card information, a billing zip code, and a secret question.

20. A non-transitory computer-readable medium comprising instructions, which when executed by one or more processors, perform the following operations:
receive a request addressed to an addressee;
analyze the request based on at least one security signature;
based on the analysis, determine a threat level associated with the request;
determine a flag and a location associated with the threat level;
insert the flag into a network packet associated with the request to create a modified request, the inserting into the network packet being at a position in the network packet indicated by the location; and
send the modified request to the addressee, wherein an application associated with the addressee is operable to process the request based on the threat level.

* * * * *